Patented Aug. 5, 1947

2,424,994

UNITED STATES PATENT OFFICE 2,424,994

VITAMIN A ACID AND ITS ESTERS AND METHOD OF MAKING THEM

Nicholas A. Milas, Belmont, Mass., assignor to Research Corporation, New York, N. Y., a corporation of New York No Drawing. Original application June 20, 1944, Serial No. 541,293. Divided and this application August 30, 1946, Serial No. 694,155

5 Claims. (Cl. 260—410.9)

This invention relates to vitamin A acid and its esters having the formula

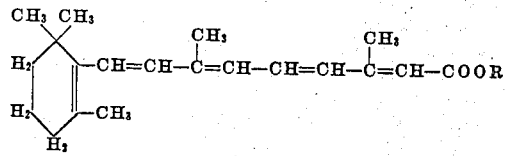

in which R stands for hydrogen or an alkyl group, and to a method of making them.

The process may be regarded as starting with the compound having the formula

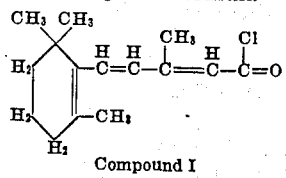

Compound I although, as will be apparent, the synthesis may be carried on from any of the intermediate products regardless of how they may have been prepared.

In my complete process starting with Compound I, the first step is to condense Compound I with malonic ester in the presence of an alcoholate such as magnesium or lithium alcoholate to form Compound II, as follows:

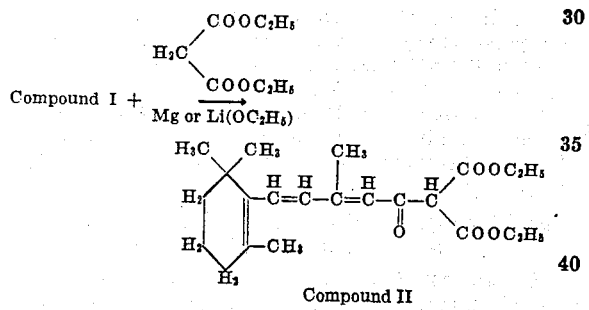

Compound II

In the second step Compound II is condensed with ethyl tetrolate (Compound III) in the presence of sodium alcoholate to give Compound IV.

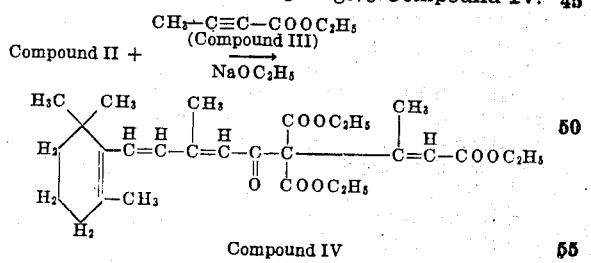

Compound IV

Compound IV is then saponified in the presence of alcoholic potash to give the tri-carboxylic acid Compound V.

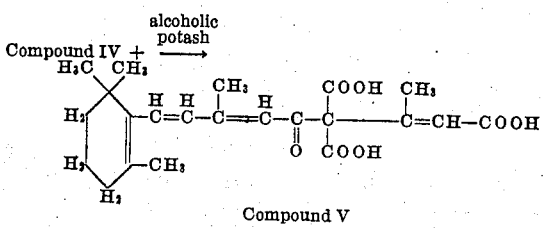

Compound V

When compound V is heated in an inert atmosphere in the presence or absence of an organic base such as pyridine or powdered metallic copper it is decarboxylated to Compound VI.

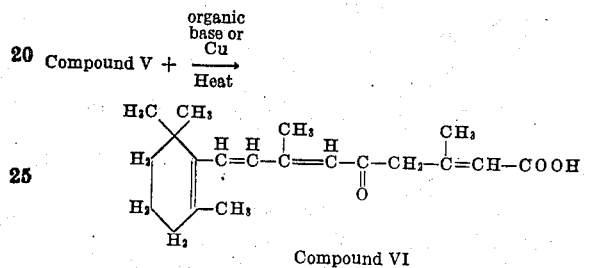

Compound VI

When Compound VI is esterified to Compound VII which is then reduced with aluminum isopropylate Compound VIII results.

Compound VI + esterification ⟶

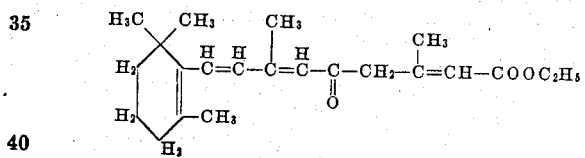

Compound VII

Compound VII + Al (isopropylate)₃ ⟶

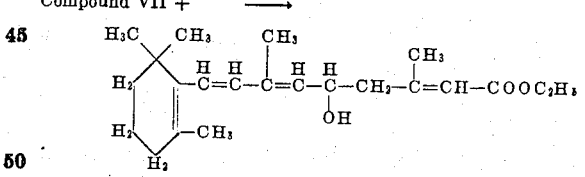

Compound VIII

When Compound VIII is treated with thionyl chloride in the presence of pyridine or with p-toluene sulphonic acid in the presence of benzene or toluene or with anhydrous oxalic acid it becomes dehydrated to Compound IX.

Compound VIII + $\xrightarrow[\substack{\text{or p-toluene} \\ \text{sulphonic acid or} \\ \text{(COOH)}_2}]{\text{SOCl}_2 + \text{pyridine}}$

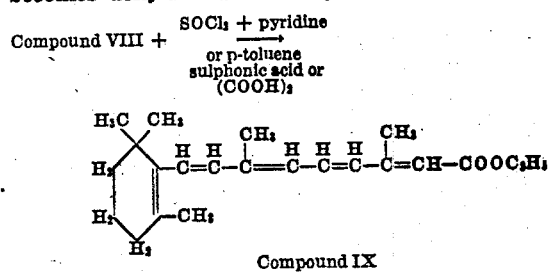

Compound IX

This compound which is the ethyl ester of the vitamin A acid may be saponified with alcoholic potash to form the vitamin A acid, Compound XI.

Compound IX may be more simply prepared by reducing compound IV with aluminum isopropylate to form Compound X.

Compound IV + $\xrightarrow[\substack{\text{aluminum} \\ \text{iso-propylate}}]{\text{reduction}}$

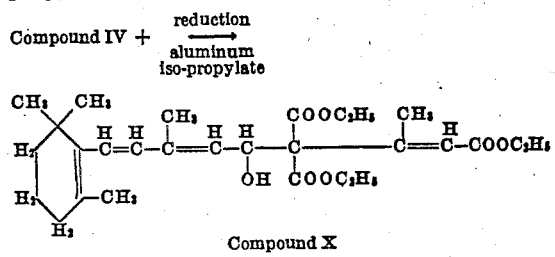

Compound X

Then Compound X is saponified with alcoholic potash and the resulting hydroxy tricarboxylic acid formed is decarboxylated in the presence of pyridine. This latter operation simultaneously dehydrates the hydroxy acid to form the vitamin A acid Compound XI.

Compound X + $\xrightarrow[\text{alcoholic potash}]{\text{saponification}}$ + $\xrightarrow[\text{pyridine}]{\substack{\text{decarboxylate} \\ \text{and dehydrate}}}$

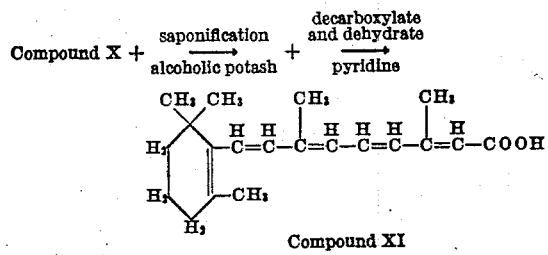

Compound XI

Compound XI can easily be converted to Compound IX by the methods of esterification described in more detail hereinafter.

Compound IX may be converted to vitamin A by treating it with excess hydrogen calcium bromide, thereby producing the desired alcohol or vitamin A.

Vitamin A may also be produced from Compound XI by making first the corresponding acid chloride of this compound and then reacting the acid chloride with excess hydrogen magnesium bromide or hydrogen calcium bromide or iodide.

A shorter procedure for the preparation of Compound IV consists in treating Compound I with Compound XII in the presence of magnesium or lithium alcoholates.

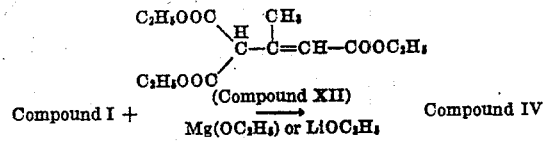

Compound I + (Compound XII) $\xrightarrow{\text{Mg(OC}_2\text{H}_5\text{) or LiOC}_2\text{H}_5}$ Compound IV In the foregoing outline and in the following detailed description, I have ililustrated the use of compounds containing chlorine as in Compound I and the ethyl group as in the malonic ester. It will be understood that generally other halogens may be substituted for the chlorine and other lower alkyl groups may be substituted for the ethyl group.

The following are detailed descriptions of the steps briefly outlined above.

*Condensation of the acid chloride, Compound I, with diethyl malonate*

Magnesium alcoholate is made by refluxing a mixture of 100 cc. of absolute ethyl alcohol, 2 cc. of carbon tetrachloride and 17.5 g. of clean magnesium turnings for 15 hours. The magnesium alcoholate is then cooled to 0° and 114 g. of diethyl malonate is slowly added with care, keeping the temperature as low as possible. After the vigorous reaction is over, 300 cc. of anhydrous ether is added and the mixture refluxed until most of the magnesium disappears. The mixture is then cooled to 0° and an ethereal solution of 90 g. of the acid chloride, Compound I, added and the mixture gently refluxed on the water bath for several hours. Acetic acid (25%) is then cautiously added until the solution is acid to litmus and all precipitated solid dissolved. The non-aqueous layer is separated and the aqueous layer extracted once again and the combined ether layers washed with sodium carbonate solution (10%), then with sodium chloride solution (10%) and dried over magnesium sulfate. When the ether was removed and the excess malonic ester distilled under reduced pressure, a dark brown liquid, Compound II, remained.

The ester, Compound II, gives a strong greenish brown coloration with ferric chloride solution and the absorption spectrum in the region of about 3290 Å.

*Condensation of compound II with ethyl tetrolate—Compound III*

Into 200 cc. of absolute alcohol dissolve 4 g. of metallic sodium, then add slowly to the mixture 50 g. of Compound II. When all of the latter has dissolved, add slowly, with shaking and cooling to prevent rapid reaction, 15.6 g. of ethyl tetrolate (Compound III). Allow the mixture to stand at room temperature overnight, then add to it 50 cc. of ice-cold sulfuric acid solution containing 5 cc. of concentrated sulfuric acid. Separate the oil that forms and extract the aqueous mixture twice with ethyl ether, combine the extracts with the oil, and wash the combined mixture with a 10% solution of sodium chloride and dry it over anhydrous magnesium sulfate. Remove the ether and distill under reduced pressure the excess ethyl tetrolate, leaving Compound IV.

The product, Compound IV, is a brown viscous liquid. It gives no ferric chloride reaction and has an absorption band the maximum of which is 2800 Å.

*Saponification of Compound IV to the tricarboxylic acid, Compound V*

A solution of 5.5 g. of Compound IV in 95% alcohol was mixed with 35 cc. of alcoholic potash containing 3 g. of potassium hydroxide and the mixture allowed to stand at room temperature for one hour, then gently heated on the steam bath for 75 minutes while nitrogen was being passed through the solution. The mixture was then cooled and poured into 2 volumes of water and the resulting mixture extracted three times with ether to remove any unsaponifiable material. The aqueous solution was then acidified with cold 10% orthophosphoric acid solution and the tricarboxylic acid extracted three times with ether; the extracts combined, washed several times with a saturated solution of sodium chloride and dried over magnesium sulfate. After the mixture was filtered and the ether removed under reduced pressure, the brown viscous tricarboxylic acid, Compound V, was subjected to a high vacuum (1 mm.) in an atmosphere of nitrogen for 3 hours at about 45° to remove any volatile materials. Partial decarboxylation occurred at this stage. Further decarboxylation of the product may be accomplished by heating at 1 mm. pressure for a longer time or at a higher temperature, e. g. for 4 hours at 60° C., for 5 hours at 95° C. and for 5 hours at 130° C.

A neutralization equivalent was taken of the product heated at 130° C. and found to be 300 as against 316, the calculated value.

A sample made via the β-methyl-γ-carboethoxy glutaconic ester was decarboxylated in the same manner and gave identical results.

*Decarboxylation of tricarboxylic acid, Compound V, by pyridine to produce Compound VI*

To 10 g. of tricarboxylic acid (Compound V) was added 8 cc. of anhydrous pyridine and the mixture allowed to stand overnight at room temperature. A solution of 63 cc. of 10% phosphoric acid was then added to the mixture with cooling in ice and the resulting mixture vigorously shaken until the odor of pyridine was no longer perceptible. The mixture was then extracted with ether and the ether extract washed with water and dried as before. The ether was removed under reduced pressure and the residue, Compound VI, subjected to a vacuum of 2 mm. at 60-70° for two hours.

The decarboxylation has also been accomplished by heating gently in the presence of metallic copper powder.

*Esterification of Compound VI and subsequent reduction of the ketoester (Compound VII) to the hydroxyester (Compound VIII)*

Esterification of the ketoacid (Compound VI) was effected by four independent methods:

(1) By refluxing for 3 hours a mixture of the ketoacid (8.5 g.), absolute ethyl alcohol (8 cc.), anhydrous copper sulfate (4.5 g.) and sulfuric acid (0.2 cc.);
(2) By heating at 100° for 24 hours in a sealed tube the silver salt (2.23 g.) of the ketoacid with ethyl iodide (3 g.);
(3) By making the acid chloride of the ketoacid (8.5 g.) in dry benzene with phosphorus trichloride (9 g.), cooling to 0° to remove phosphorus acid, and removing benzene and excess phosphorus trichloride under reduced pressure and reacting the residue with a solution of absolute alcohol (10 cc.) in 25 cc. of dry pyridine;
(4) By treating the sodium salt of the ketoacid with diethylsulfate.

In all cases the product, Compound VII, obtained had the expected analysis. The ketoester, Compound VII, exhibits an absorption band the maximum of which is in the region of 2800 Å.

The reduction of the ketoester (Compound VII) was accomplished by means of aluminum iso-propylate. About 4 g. of the ketoester was refluxed overnight in 60 cc. of anhydrous iso-propyl alcohol containing aluminum iso-propylate corresponding to about 0.6 g. of metallic aluminum. Tests made from time to time for the production of acetone gave positive results indicating reduction of the ketoester. Finally, the iso-propyl alcohol was distilled and the residue taken up in 100 cc. of 20% acetic acid, the mixture extracted with ether and the ethereal solution washed first with a 10% solution of sodium bicarbonate, then with water and finally dried over magnesium sulfate. After filtration, the ether was removed and the residue, Compound VIII, subjected to high vacuum (2 mm.) to remove volatile substituents. The product gave a Zerewitinoff number corresponding closely to one active hydrogen.

*Deydration of Compound VIII to produce Compound IX*

The hydroxyester (Compound VIII) is easily dehydrated by heating it with about one one-hundredth its weight of anhydrous p-toluene sulfonic acid and anhydrous toluene. The latter is distilled under slightly reduced pressure and carries over the water formed into the distillate. The residue is then purified by removing the p-toluene sulfonic acid with a 10% solution of sodium carbonate. The ester (Compound IX) is then extracted with ether and when the ether is removed the residual highly viscous product has the properties and analysis corresponding to the formula of Compound IX.

The dehydration of Compound VIII to produce Compound IX may also be accomplished by making the para-toluene sulfonic ester of this compound by reacting it with para-toluene sulfonyl chloride in pyridine, then subsequently reacting the sulfonic ester with alcoholic potash. This reaction tends to remove para-toluene sulfonic acid rather than hydrolyzing the sulfonyl group thereby producing the conjugated acid which can be esterified to produce Compound IX. The dehydration may also be accomplished by refluxing Compound VIII in the presence of nitrogen with pyridine and thionyl chloride. This again has the ability to chlorinate and dehydrochlorinate the hydroxyl group thereby producing the ester and Compound IX.

The Compound VIII may also be dehydrated by heating it with anhydrous oxalic acid.

*Reduction of the ketotriester (Compound IV) to produce the hydroxytriester Compound X*

The ketotriester (Compound IV) (3.6 g.) was reduced with aluminum iso-propylate in the same manner as the ketoester (Compound VII). The product obtained after purification had the properties and analysis corresponding to the formula given above for Compound X.

*Hydrolysis of Compound X and subsequent decarboxylation of the tricarboxylic acid to produce Compound XI*

The hydroxytriester (Compound X) (3 g.) was hydrolyzed by heating it on the water with alcoholic potash (10%), pouring the mixture into 2 volumes of water, extracting with ether to remove any non-saponifiable material, acidifying the aqueous layer with phosphoric acid (10%) and extracting with ether the liberated tricarboxylic acid. When this acid is subjected to the pyridine decarboxylation as in the case of the decarboxylation of Compound V, the product dehydrated and decarboxylated at the same time to form the monocarboxylic acid (Compound XI). Compound XI can easily be converted to Compound IX by using the methods of esterification described for Compound VI.

*The reduction of Compound IX to produce vitamin A*

The reduction of the ester Compound IX is accomplished by reacting it in anhydrous ether solution with 1 mol. of hydrogen magnesium bromide (HMgBr) or hydrogen calcium iodide (HCaI), then hydrolyzing the product with an ice cold solution of ammonium sulfate or ammonium chloride and extracting the mixture with more ether, combining the ethereal extracts, washing the combined solution with a saturated sodium carbonate solution and drying over anhydrous magnesium sulfate. When the ether is removed under reduced pressure the residue exhibits the properties of vitamin A.

*Conversion of Compound XI to vitamin A*

Compound XI is first treated in anhydrous benzene at 0° with an equimolecular quantity of phosphorus trichloride, then the mixture is heated at 40° for one-half hour. Cool the mixture to 0° and decant to separate from solid phosphorus acid, then remove the benzene and unreacted phosphorus trichloride at room temperature under reduced pressure. Dissolve the acid chloride in a mixture of anhydrous ether and benzene and treat it with hydrogen calcium iodide (HCaI). After the mixture is allowed to stand at room temperature overnight, it is hydrolyzed with an "ice-cold" solution of ammonium sulfate. The mixture is then extracted with anhydrous ether, the extract dried over magnesium sulfate. When the ether is removed, the residue exhibits vitamin A properties.

*Synthesis of Compound IV by the condensation of Compound I with Compound XII*

Into 150 cc. of absolute alcohol dissolve 1.5 g. lithium metal and add to its slowly 46.2 g. of beta-methyl-γ-carboethoxy glutaconic ester (Compound XII). The alcohol is then removed under reduced pressure and the residue dissolved in a 50–50 mixture of anhydrous ether and benzene, and to this solution was then added 40 g. of Compound I, likewise in anhydrous benzene. The mixture was then allowed to stand at room temperature for 40 hours, then refluxed gently on the steam bath for 2 hours. Dilute acetic acid (10%) was then added until the mixture was definitely acid. The ether-benzene layer was separated, washed with a solution of sodium bicarbonate, then with water and dried over magnesium sulfate. The mixture was then filtered and the ether and benzene removed under reduced pressure whereby a highly viscous residue remained.

The above condensation has been accomplished using the magnesio salt of β-methyl-γ-carboethoxy glutaconic ester with identical results.

This application is a division of my application Serial No. 541,293, filed June 20, 1944, which in turn is a continuation-in-part of my Patent No. 2,369,158.

I claim:

1. As a new product a compound of the formula

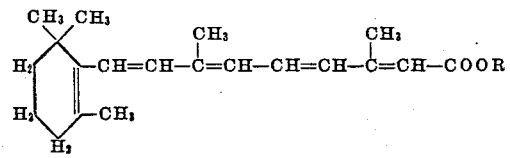

in which R stands for a member of the group consisting of hydrogen and alkyl groups.

2. Product as defined in claim 1 in which R is hydrogen.

3. Product as defined in claim 1 in which R is an ethyl group.

4. Process which comprises saponifying a compound of the formula

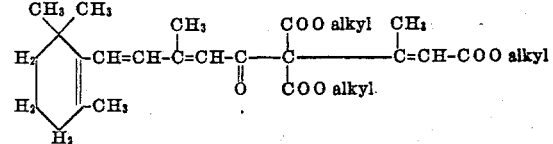

decarboxylating the resulting compound

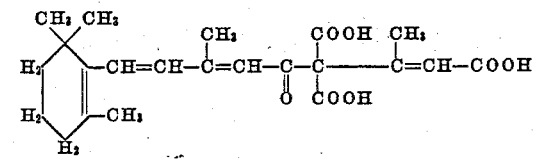

to the production of a compound of the formula

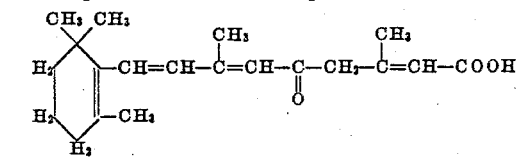

esterifying said compound to the production of a compound of the formula

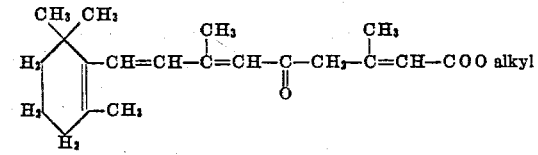

reducing said compound to a compound of the formula

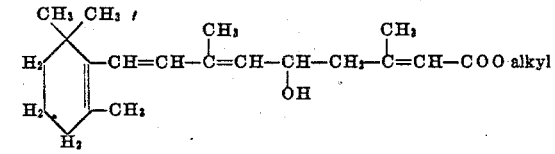

and dehydrating said compound to the production of a compound of the formula

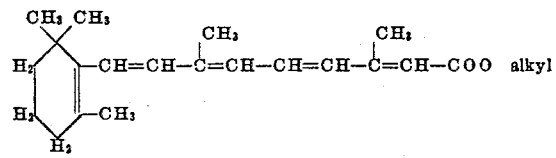

and hydrolyzing said compound to the production of a compound of the formula

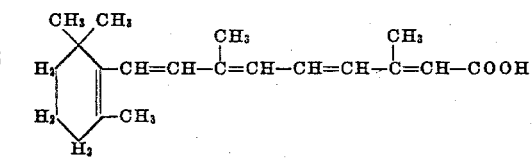

5. Process which comprises reducing a compound of the formula

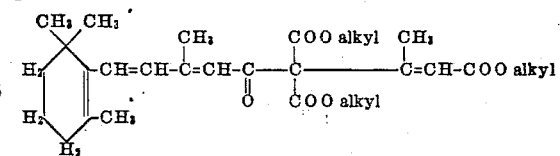

to the production of a compound of the formula

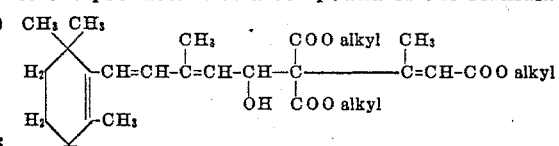

saponifying said compound to the corresponding tricarboxylic acid compound, decarboxylating said tricarboxylic acid compound to the production of a compound of the formula
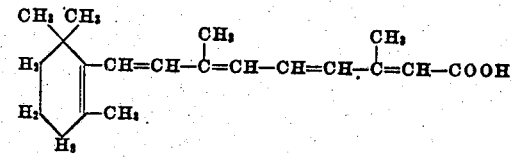
and esterifying said compound to the production of a compound of the formula
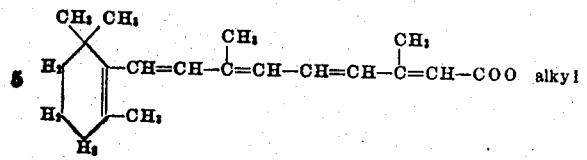
NICHOLAS A. MILAS.